United States Patent [19]

Gujarathi

[11] Patent Number: 4,480,078
[45] Date of Patent: Oct. 30, 1984

[54] CONTINUOUS EMULSION POLYMERIZATION PROCESS

[75] Inventor: Ramesh N. Gujarathi, Akron, Ohio

[73] Assignee: The Goodyear Tire & Rubber Company, Akron, Ohio

[21] Appl. No.: 574,313

[22] Filed: Jan. 27, 1984

Related U.S. Application Data

[63] Continuation of Ser. No. 427,367, Sep. 29, 1982, abandoned, which is a continuation of Ser. No. 304,743, Sep. 23, 1981, abandoned.

[51] Int. Cl.³ ............................................ C08F 265/02
[52] U.S. Cl. ..................................... 526/65; 523/201; 524/458; 524/460
[58] Field of Search ...................... 526/65, 66, 80, 87; 524/458, 460; 523/201

[56] References Cited

U.S. PATENT DOCUMENTS 4,246,156  1/1981  Heins ................................... 524/460

Primary Examiner—Paul R. Michl
Attorney, Agent, or Firm—D. O. Nickey

[57] ABSTRACT

This invention relates to an improved continuous emulsion polymerization process. Specifically, this invention relates to an improved method for producing carboxylated styrene/butadiene latices. The improvement is characterized in that a reaction mixture containing specified reaction ingredients and only a portion of the primary monomers is charged to a first reaction zone followed by subsequent injection of the remaining portion of the primary monomers to the following reaction zone in a chain consisting of two or more reactors. The latices produced by the process of this invention have improved stability during polymerization and improved physical and application properties.

7 Claims, No Drawings

CONTINUOUS EMULSION POLYMERIZATION PROCESS

This is a continuation of application Ser. No. 427,367, filed Sept. 29, 1982, abandoned, which is a continuation of application Ser. No. 304,743, filed Sept. 23, 1981, now abandoned.

TECHNICAL FIELD

The present invention pertains to an improved continuous emulsion polymerization process. More specifically, it pertains to the preparation of latices with "feed-monomer injection", hereinafter referred to as "FIM". The invention is based on the "FIM" technique which results in superior polymerization, physical and application properties of the final product.

BACKGROUND ART

At the present carboxylated latices are manufactured using three different types of polymerization processes. These accepted processes are batch, semi-continuous or semi-batch and continuous.

Each type of process has its unique characteristics and limitations. Although the basic chemistry of free radical emulsion polymerization is common, each process differs substantially, in that different reaction components and conditions are found in each. Different materials, variations in process conditions, the method and logistics of material addition all play a major role in affecting final product properties and these factors vary from process to process.

The process of U.S. Pat. No. 3,966,661 imparts certain undesirable properties to the latex, requires low critical micell concentrations (CMC) and anionic surfactants of only certain types at relatively high concentrations to maintain desired reaction speed and reaction conversions.

U.S. Pat. No. 4,272,426 discloses the preparation of carboxylated latex from conjugated dienes, monovinyl noncarboxylic comonomers, unsaturated carboxylic acids and at least one N-alkylolamide of an alpha betaethylenically unsaturated carboxylic acid. The polymerization reaction is carried out in two or more stages in which all of the monomeric components except the N-alkylolamide are polymerized to a conversion of 50 to 80 percent in the first stage, the reaction is continued in the second stage to which is supplied the balance or all of the N-alkylolamide. The process of U.S. Pat. No. 4,272,426 does not disclose or suggest the splitting of all of the monomeric components between two or more reactors in a continuous process, nor does it contemplate the properties that can be achieved when all of the monomeric components are divided between two or more reaction stages.

Not disclosed nor contemplated by the prior art the present invention overcomes the requirements of high surfactant and electrolyte concentrations and thereby achieves desired particle size distribution without latex particle agglomeration in an efficient and continuous process.

DISCLOSURE OF THE INVENTION

There is disclosed an improved emulsion polymerization process in two or more reactor zones characterized in that (1) the first zone is charged with reaction ingredients and only a portion of the primary monomers; (2) conducting polymerization of the reaction mixture in the first zone to conversion of 85 to 98 percent of charged monomers; (3) removing the reaction mixture from the first to a second reaction zone in which polymerization is continued with an incoming stream of the remaining portion of the primary monomers, said reaction mixture is then polymerized to 85 to 95 percent conversion of total monomers charged followed by; (4) removing the reaction mixture from the second to a third reaction zone wherein the reaction mixture is polymerized further to essentially complete conversion.

Also, within the scope of the present invention an improved continuous emulsion polymerization process is disclosed wherein a latex is produced from components (a), (b), (c) and (d) comprising (a) at least one conjugated diene, (b) 40-80 percent by weight of at least one noncarboxylic comonomer, (c) 0.1-5 percent by weight of at least one ethylenically unsaturated carboxylic acid and (d) 0.1-5 percent by weight of at least one functional monomer wherein the polymerization reaction is carried out in two or more reactor zones in which all of components (c) and (d) together with only a portion of monomeric components (a) and (b) are polymerized to a conversion of 85 to 98 percent in the first zone, the reaction is continued in a second zone, to which is supplied the balance of monomeric components (a) and (b) and is polymerized to 85 to 95 percent conversion of total monomers charged followed by removing the reaction mixture from the second to a third reaction zone to which functional monomer is added and the reaction mixture is polymerized further to essentially complete conversion.

Another aspect of the present invention discloses a continuous emulsion polymerization process for the preparation of a latex from monomeric components (a), (b) and (c) comprising (a) at least one conjugated diene (b) 40 to 80 percent by weight of at least one noncarboxylic vinyl aromatic comonomer and (c) 0.1-5 percent by weight of at least one ethylenically unsaturated carboxylic acid, wherein the polymerization reaction is carried out in at least two zones connected in series, the improvement is characterized in that 25 to 75 percent of the total of monomeric components (a) and (b) are placed in the first zone and polymerized to a conversion of 85 to 98 percent of monomers charged and thereafter removed to a second zone wherein the remaining 25 to 75 percent of the total of monomeric components (a) and (b) are injected and polymerized to a conversion of 85 to 90 percent of total monomers charged and thereafter removed to a third zone wherein the reaction mixture is polymerized to essentially complete conversion and thereafter is removed from the last zone.

The process of the present invention provides numerous advantages over what is presently known in the art, specifically, greater process latitude in terms of raw material handling and additions for effective utilization, controlled distribution of reaction heat load between reactors thereby eliminating the need for an inline precooler and easy product changeover in the production operation. Additionally, the process of the present invention eliminates or substantially reduces the twilight production (product changeover) by way of changing primary monomer composition only in the second stage reactor. Further, the process of the present invention provides satisfactory reaction speed and reaction conversions with minimum reactor fouling at low surfactant concentrations.

The process of the present invention also allows for lower surfactant concentrations and greater flexibility in using different types of surfactants or surfactant systems. The process of the present invention achieves higher surface tension on latices and still maintains the advantage of better product uniformity while also using an efficient continuous process as opposed to a less efficient batch and semi-continuous processes.

MORE DETAILED DISCLOSURE

The reaction mixtures or ingredients (sometimes referred to as polymerization recipes) that are used in the process of the present invention are comprised of (1) water which is added in sufficient amount to provide latex having a solids content of 49 to 54 percent by weight after polymerization, (2) primary monomers, (3) monomeric carboxylic acids, (4) optionally other functional vinyl monomers and (5) nonpolymerizable substituents such as (a) chain transfer agents, (b) electrolytes, (c) chelating agents, (d) emulsifiers, and (6) initiators.

The primary monomers in the reaction mixture of the present invention are comprised of conjugated dienes preferably having 4 to 10 carbon atoms and one or more noncarboxylic comonomers. Examples of conjugated diene type monomers are butadiene, isoprene, 2,3-dimethyl butadiene, 1,3-butadiene being particularly suitable. Substituted conjugated dienes such as chloro or cyano butadiene may be used if desired. The conjugated diene comprises 20 to 100 percent by weight of the total monomers in the final product.

The noncarboxylic comonomers may be vinyl aromatic compounds, such as styrene, α-methylstyrene and vinyl toluene, styrene being preferred or an aliphatic monomer, such as unsaturated nitrile, for example acrylonitrile or methacrylonitrile. Other vinyl monomers such as vinylidine chloride, ethyl acrylate, butyl acrylate, methyl methacrylate, hexyl acrylate, 2-ethyl hexyl acrylate may be used. The amount of noncarboxylic co-monomer, especially styrene is preferably 40 to 80 percent by weight of total monomers in the final product.

Representative of the carboxylic acids that can be used in the process of this invention are the ethylenically unsaturated carboxylic acids which may be monocarboxylic or a polycarboxylic acid or a mixture of such acids. Preferably the acids have 2 to 10 chain carbon atoms. Examples of preferred monocarboxylic acids are acrylic acid and methacrylic acid. Examples of polycarboxylic acids are maleic acid, fumaric acid and particularly itaconic acid which is preferred. Substituted monocarboxylic acids and substituted polycarboxylic acids may be used if desired. The amount of carboxylic acid used is preferably 0.5 to 5 percent by weight based on total monomers. The carboxylic acid(s) used is preferably supplied to the first reactor in the free acid form.

Other functional or specialty monomers in addition to carboxylic acids may be included in the process of this invention to effect certain polymerization and application properties. Among the types of functional monomers which have been traditionally employed are those containing hydroxyl, amide, methylolamide, ester, amine, epoxy, aldehyde and halogen functional groups. Typical of these specialty monomers are hydroxy ethyl and propyl acrylates and methacrylates, acrylamide, methacrylamide, N-methylol acrylamide, mono and di esters of polycarboxylic acids such as methyl and n-butyl itaconate, n-dibutyl itaconate, dibutyl maleate and fumarate and dimethylaminoethyl methacrylate. Functional monomers in the amount of 0.1 to 5 percent of total monomer in the reaction mixture can be added either to the first, second or third reactor depending upon the desired distribution required to influence certain polymerization and application properties.

Modifiers or chain transfer agents used in the process of the invention are short or long-chain alkyl mercaptans and are used to control the molecular weight of the polymers. Representative of the mercaptans that can be used in the process of the present invention are octyl, decyl, lauryl, t-dodecyl and t-hexadecyl mercaptans. It is possible to employ any of such modifiers individually or in combination contingent to achieving desired polymer properties. With the monomeric systems of this invention, it is preferable that a modifier be present. Tertiary dodecyl mercaptan is a preferred chain transfer agent used at a level of 0.2 to 0.8 phm (parts per one hundred parts of monomers). It may either be premixed with the primary monomers or charged separately. It is also preferred that the modifier be split in the same proportion that the primary monomers are split and charged to both the first and second reactor.

The process of the present invention also contemplates the incorporation of polymerizable antitoxidants. These antioxidants have shown great potential in the stabilization of oxidizable organic materials due to their nonextractability and nonvolatility. These antioxidants as monomers are polymerized with one or more comonomers so as to have the antioxidant moiety chemically attached to the polymer structure. The following list is representative of polymerizable antioxidants that can be used in the process of this invention and is not intended to be limiting:

N-(4-anilinophenyl)acrylamide
N-(4-anilinophenyl)methacrylamide
N-(4-anilinophenyl)maleimide
N-(4-anilinophenyl)itaconimide
4-anilinophenyl acrylate
4-anilinophenyl methacrylate
3-N-(4'-anilinophenyl)amino-2-hydroxy-propyl methacrylate These polymerizable antioxidants are known in the art and are covered by numerous U.S. patents. They are incorporated in antioxidant amounts and may be added to the 1st, 2nd, or 3rd reactors. These polymerizable antioxidants can be considered functional or specialty monomers and may be used accordingly.

The preparation of a polymer latex employs many different nonpolymerizable components whose function to a great deal is interdependent. The present invention comtemplates the use of these prior known nonpolymerizable components generally employed in emulsion polymerization technology. Thus, the aqueous phase in the reaction mixture may include chelating agents, electrolytes, emulsifying agents or surfactants and similar ingredients.

A representative chelating agent included in the reaction mixture is the sodium salt of ethylene diamine tetracetic acid.

The electrolytes suitable for use in the reaction mixture of this invention are those which are traditionally used in the latex industry. Typical of these electrolytes are tri and tetra sodium and potassium pyrophosphates, sodium, potassium and ammonium carbonates, bicarbonates and sulfates. More specifically, tetrasodium pyrophosphate is preferred. The concentration of chelating agent and electrolyte in the reaction mixture is that minimum necessary for achieving their desired optimum effect.

The emulsifier system in the reaction mixture may be a combination of two or more surfactants selected from the anionic class alone or in combination with the nonionic class of materials conventionally used in making polymer latices. Typical of some of the anionic emulsifying agents are alkyl sulfonate, alkyl aryl sulfonates, condensed naphthalene sulfonates, alkyl sulfates, ethoxylated sulfates, phosphate esters and esters of sulfosuccinic acid. Representative of these surfactants are sodium alpha-olefin ($C_{14}$–$C_{16}$) sulfonates, alkali metal or ammonium dodecyl benzene sulfonate, sodium dodecyl or dihexyl diphenyl oxide disulfonate, alkali metal lauryl alcohol sulfate, sodium alkyl aryl polyether sulfate and lauryl alcohol ether sulfate, complex phosphate ester of ethylene oxide adduct and sodium dioctyl, dihexyl and dicylohexyl sulfosuccinate. Nonionic type surfactants may optionally be included in combination with a surfactant system comprised of one or more anionic surfactants. Examples of nonionic surfactants include polyoxyethylene condensates such as octyl-phenoxy polyethoxy ethanol and polyoxyethylene nonylphenyl ether. A total concentration of the emulsifier system is normally included in the reaction mixture in an amount of about 0.4 to 0.3 phm. It has been found particularly desirable that the surfactant system of this invention be employed more suitably at the active level of 0.4 to 0.8 phm (parts per one hundred parts of monomers) for optimum latex properties.

Water soluble free radical initiators or catalysts employed in the process of this invention are those that are traditionally used in emulsion polymerization. Typically free radical initiators are persulfates, water soluble peroxides and hydroperoxides; more specifically, sodium, potassium and ammonium persulfate, hydrogen peroxide and t-butyl hydroperoxide. Other water soluble initiators of similar decomposition mechanism may be used if desired.

Ammonium persulfate, a preferred catalyst system at a concentration of 0.7–1.0 phm is premixed with a portion of the electrolyte and water and this aqueous solution of the catalyst is charged to the bottom of the first reactor. A portion of the catalyst solution may be charged after the final reaction vessel to achieve substantial reduction of residual unreacted monomers in the latex thereby improving efficiency during steam-stripping.

BEST MODE FOR CARRYING OUT THE INVENTION

The process of this invention is particularly suitable for emulsion polymerization of butadiene, styrene and one or more unsaturated carboxylic acids and with or without other functional monomers.

The process may be carried out in a batch or semi-continuous process, however, due to economic and production reasons the process is preferably carried out on a continuous basis. Two or more reaction zones, preferably three reaction zones, connected in series are used. By reaction zone is meant a reaction vessel that will withstand the superatmospheric pressures involved and also provides a means for keeping the particular reaction zones at the appropriate temperature.

Preferably the process should be carried out in a chain consisting of three "continuous stirred-tank reactors" (CSTR) connected in series. The polymerization is conducted preferably at pH of 1.5 to 2.5 and under constant pressure of 150–180 psig controlled by the back pressure regulator provided in the system. Constant temperature is maintained in each zone during polymerization. Preferably, the first zone is maintained at 68°–85° C., the second zone at 75°–90° C. and the third zone at 85°–95° C.

Different reaction components are supplied at the appropriate charge rate so that the total residence time which corresponds to the reaction time is 9 to 15 hours (3 to 5 hours per reactor). Lower polymerization temperatures of 60° to 75° C. may be used if desired by extending the reaction time.

Various feed-streams in the process containing different reaction components are preferably supplied at the base of a zone in a chain. Functional monomer feed-stream, however, can be supplied from the top of a zone through the dip-leg pipe extended to the bottom of the zone.

The buffer stream consisting of a mixture of water, emulsifiers, electrolyte, chelating agent, monomeric polycarboxylic acid and a portion of primary monomer feed stream containing premixed primary monomers and the modifier; are mixed in the inline static mixer while being charged continuously at the base of the first zone through a common header. Premixing of these reaction components helps to pre-emulsify monomers. The catalyst solution is preferably charged separately at the base of the first zone. The reaction mixture in the first zone is preferably converted to 85–98 percent and removed to the second zone where the remaining portion of the primary monomer feed stream (FIM) is injected from the bottom. The primary monomers and the modifier are divided between the first and the second zone in the ratio of 25/75 to 75/25 with the 50/50 split being more preferred. The reaction mixture in the second zone is converted to 85–95 percent and removed to the third zone for further polymerization to essentially complete conversion. The latex recovered from the last zone is partially neutralized and subjected to steam-stripping to remove residual unreacted monomers. Post additives such as antioxidants, dispersants and bactericides may be added to the latex prior to storage.

As mentioned before, it is imperative that the primary monomers in the process of this invention be divided and charged to the first and the second zone to achieve desired significant improvement in polymerization and product properties. Unlike the prior art, the continuous injection of a portion of monomers into the second zone (heretofore referred to as "feed monomer injection") permits subtantial flexibility during polymerization and helps to significantly reduce surfactant concentrations with no trade-off in latex stability, product uniformity and productivity.

The following examples are intended to illustrate and not limit the scope of the present invention. The following examples in accordance with the present invention were carried out on a pilot plant scale. The pilot plant equipment consisted of three 316 stainless steel 30 gallon reactors connected in series. Each reactor is equipped with two baffles and one turbine agitator run at slow speed to minimize back-mixing. Each reactor was jacketed for the circulation of heating and cooling medium which was controlled automatically to maintain desired polymerization temperature. Constant pressure higher than the autogeneous pressure of the reaction mixture was also maintained with the back-pressure regulator installed on the latex overflow outlet line on the last reactor.

Various solutions containing different reaction ingredients were premixed in the make-up or charge tanks.

Continuous charge streams except the primary monomers were metered into the respective zones with metering pumps. The primary monomer stream was divided and charged continuously to the first and second zone by a positive displacement piston meter. Metering was controlled by a Blendtrol ™ system equipped with a microprocessor. (Micro-Blentrol ™, registered trademark of Foxboro Co.) A desired primary monomer split-ratio and corresponding charge rates to the first two zones were thus maintained in the process.

The buffer stream and the primary monomer stream designated for the first zone were premixed in the inline static-mixer and charged through a common line connected at the bottom of the first zone. The catalyst stream was charged through a separate line also connected at the bottom of the first zone. A portion of the primary monomer stream designated for the second zone (FIM) was injected at the base of the second zone. Secondary or functional monomer streams when included were metered into the appropriate zone through a top entering dip-leg. The reaction mixture was passed from the first to the second and finally to the third zone after a certain residence time in each zone, which is determined by charge rates and the zone capacity. Three-stage polymerized latex was continuously removed from the top of the last zone and subjected to further processing, i.e. steam stripping.

EXAMPLE 1

Carboxylated styrene-butadiene latex based on the following formulation was prepared by the process of this invention.

TABLE 1

| Stream | Ingredient | Active Parts By wt., (phm) Parts/hundred Parts of Monomer |
|---|---|---|
| 1. Primary Monomer Feed Stream | | |
| Monomer | Butadiene | 40.75 |
| Comonomer | Styrene | 56.75 |
| Modifier | t-dodecyl-mercaptan | 0.40 |
| 2. Buffer Stream | | |
| | Water* | 67.55 |
| | Surfactant System | 0.55 |
| Chelating Agent | Na—salt of EDTA** | 0.04 |
| Electrolyte | Tetra sodium-pyrophosphate | 0.04 |
| Monomeric Acid | Itaconic acid | 2.50 |
| 3. Catalyst Stream | | |
| | Water* | 30.0 |
| Electrolyte | Tetra sodium-pyrophosphate | 0.01 |
| Initiator | Ammonium persulfate | 0.85 |

*May be adjusted for total solids of 49–54%
**Versene - 100 from Dow Chemical Co.

Before commencing polymerization, the first zone was filled partially (about 25 percent of the zone volume) with a carboxylated latex to provide for a heal and the zone was heated to 79.5° C. Continuous polymerization was started by charging the buffer, the catalyst and fifty percent of the primary monomer stream to the first zone. The remaining fifty percent of the primary monomer feed stream was charged to the second zone when the second zone was about 25 percent full of the incoming reaction mixture from the first zone. All the flows were maintained at a charge rate to provide a total residence time of 11.5 hours. Polymerization was conducted under a pressure of 170–180 psig and moderate mixing was maintained in each zone. The first zone was maintained at 79.5° C., the second zone at 85° C. and the third zone at 90° C. during the entire run.

The latex thus produced was partially neutralized to pH of 6.0–6.5 with ammonium hydroxide and defoamer was added prior to steam stripping. The latex was further neutralized to pH of 9.0–9.5 after steam stripping and other post-additives such as dispersant, antioxidant and bactericide were added.

Polymerization and physical properties were as follows:

TABLE II

| POLYMERIZATION DATA | | | |
|---|---|---|---|
| | Reactor #1 | Reactor #2 | Reactor #3 |
| pH | 1.9–2.4 | 1.9–2.4 | 1.9–2.4 |
| Conversion | 90–97 | 85–90 | 90–99 |
| Surface Tension, mN/m | 47–49 | 50–55 | 51–55 |
| Residual Styrene, % | 0.3–1.0 | 0.6–1.5 | 0.5–0.9 |
| Finished Latex Physical Properties (After Steam Stripping) | | | |
| pH | 9.3 | | |
| Solids, % | 54.6 | | |
| Brookfield Viscosity, mPa·S | 366 | | |
| Turbidity, % | 2.9 | | |
| Surface Tension, mN/m | 54.5 | | |
| Coagulum (150-mesh), % | 0.006 | | |
| Mechanical Stability, mg | 2.0 | | |
| Residual Styrene, % | <0.1 | | |

Latex physical tests run per ASTM 1475-75 test methods.

EXAMPLE 2

COMPARATIVE TESTING

Samples of the latex prepared in Example 1 (Latex A) were compared to a latex made by a conventional 2-reactor continuous process (Latex B) which is a commercially available latex, having a similar composition to Latex A, and a high quality competitive secondary backing carboxylated SBR latex (Latex C), which is a commercially accepted latex. Latex A, B and C were tested in a conventional (non-frothed) secondary backing formulation:

TABLE III

| | Dry Parts By Weight |
|---|---|
| Latex | 100.0 |
| *Georgia Marble D-70 | 350.0 |
| **Paragum 141 | To Brookfield viscosity of 19,500–20,500 mPa's (LVF spindle 4 @ 12 RPM) |
| Water | To 76% total content |

*Calcium Carbonate Type Filler
**Sodium Polyacrylate Thickner from Para-Chem. Southern In secondary backing processes a second layer of a backing such as jute is applied to the back of the carpet and adhered to it using a latex compound. The latex compound is spread on to the back of the carpet and the secondary backing applied. The sandwich is then pressed through a nip roller to aid adhesion and to insure that sufficient compound penetrates into the carpet tufts. For secondary backing applications the latex must have good quick-grab characteristics, rapid drying properties, excellent tuft lock and high adhesion to the secondary backing.

Secondary backed carpet samples were prepared from each composition by hand-coating level-looped nylon greige goods at a coating weight of 27 oz./yd$^2$ (915.4 gms/m$^2$). The secondary backing was 9.5 oz./yd$^2$(508.6/m$^2$). The prepared composite was dried and cured in a forced draft oven set at 135° C. Test results on the carpet composition were as follows:

TABLE IV

| | COMPARATIVE TEST RESULTS FROM EXAMPLE 1 (Latex A) | | |
|---|---|---|---|
| | Latex A | Latex B | Latex C |
| Surface Tension, mN/m | 54.4 | 40.2 | 49.0 |
| Compound Stability, minutes | 30 | 28 | 18 |
| Paragum 141, gms (wet) | 5.7 | 6.4 | 6.9 |
| Initial Compound Viscosity #4 @ 12 RPM mPa · S | 20.800 | 19,600 | 20,800 |
| Viscosity Change (Drift), % Overnight static | 26.9 | 13.3 | 71.2 |
| Agitated | 2.9 | 7.1 | −1.0 |
| Flow Index | 5.4 | 5.5 | 4.7 |
| Stress Relaxation | 64.0 | 52.5 | 33.5 |
| Adhesion Profile, 27 oz./yd$^2$ (915.4 gms/m$^2$) Lbs/2-inch (Kg/5 cm) | | | |
| 4 minutes | 0.6 (1.3) | 0.95 (2.1) | 1.25 (2.7) |
| 6 minutes | 1.2 (2.6) | 1.6 (3.5) | 2.7 (5.8) |
| 8 minutes | 2.9 (6.3) | 1.9 (4.1) | 4.5 (9.8) |
| 12 minutes | 3.2 (6.9) | 1.4 (3.0) | 4.9 (10.6) |
| Ultimate | 13.0 (28.2) | 11.9 (25.8) | 10.5 (22.8) |

Delamination or compound adhesion strength was determined using a Scott-CRL tensile tester at a jaw separation rate of 12 inches (30.48 cm) per minute. Values reported are for a 2 inch (5.08 cm) carpet strip.

Ultimate delamination strength was determined after conditioning test samples at room temperature for a minimum of 30 minutes after removal from the oven.

The value for stress relaxation (yield value) is obtained by agitating the prepared compound a minimum of 90 seconds after reaching compounding equilibrium, allowing it to rest 90 seconds after removing mixing shear and measuring Brookfield viscometer spindle (RVF #3 spindle) deflection from 100 scale reading after an additional 90 seconds test time. This test measures the rate of compound viscosity recovery after removal of shear. It relates not only to compounding but system processing characteristics.

Overnight viscosity stability, measured as a percent change from the original compound viscosity, is measured by the Brookfield viscometer (spindle #4 @ 12 rpm).

It can be seen that the process of this invention can achieve high surface tension and significant improvement in polymerization and physical properties. The carboxylated latex made by the process of this invention also had improved compound stability, improved thickner demand and higher delamination strength while retaining a good balance of other properties in the non-frothed compound for the secondary backing application.

The latices prepared by the process of this invention also have overall good application properties with 30–40 percent reduction in the thickner requirement in the frothed compound over the latex made by the conventional 2-reactor continuous process. The frothed compound of 83.5 percent solids content contained 450 parts of filler, ammonium lauryl sulfate (froth-aid) added to achieve frothed compound density of 750–850 gm/l and Alcogum 9635 thickner added to achieve viscosity of 16,000–17,000 mPa's.

EXAMPLE 3

The reactor system as previously disclosed was used to compare a commercially accepted surfactant system in a conventional 2-reactor continuous process (Latex D and E), a 3-reactor continuous process with no feed monomer injection (Latex F and G) and a 3-reactor continuous process with feed-monomer injection (FIM), (Latex H and J). The formulation for each Latex D, E, F, G, H and J were identical except that concentrations of the surfactant system were varied. Comparative results of this study are presented in Table V.

TABLE V

| | COMPARATIVE RESULTS | | | | | |
|---|---|---|---|---|---|---|
| PROCESS | 2-Reactor, Old Art | | 3-Reactor, No FIM | | 3-Reactor, 50/50 FIM | |
| LATEX | D | E | F | G | H | J |
| SURFACTANT SYSTEM, LEVEL, PHM | 1.0 | 0.5 | 1.0 | 0.5 | 1.0 | 0.5 |
| POLYMERIZATION DATA | | | | | | |
| Temperature, Reactor #1, °C. | 85 | 87.8 | 73.9 | 76.7 | 79.4 | 79.4 |
| Temperature, Reactor #2, °C. | 93.3 | 93.3 | 73.9 | 76.7 | 85 | 85 |
| Temperature, Reactor #3, °C. | — | — | 82.2 | 85 | 87.8 | 87.8 |
| Percent Conversion, Reactor #1 | 65.0–75.0 | 60.0 | 28.0 | 34.0 | 95.0 | 80.0 |
| Percent Conversion, Reactor #2 | 90.0–95.0 | 94.0 | 62.0 | 68.0 | 91.0 | 90.0 |
| Percent Conversion Reactor #3 | — | — | 95.0 | 92.0 | 98.0 | 98.0 |
| Process Coagulum Level, Rating | Good | Fair | Good | Fair | Very Good | Very Good |
| Residual Styrene, Percent | 2.0–2.5 | 2.0–2.5 | — | — | 0.9 | 1.2 |
| LATEX PHYSICAL PROPERTIES | | | | | | |
| Percent Solids | 49.0 | 50.4 | 51.6 | 50.9 | 51.8 | 50.8 |
| Turbidity | 3.28 | 3.70 | 3.74 | 4.0 | 2.73 | 3.0 |
| Surface Tension, mN/m | 42–44 | 46.9 | 42.5 | 45.5 | 48.0 | 50.0 |

The above comparative results point out that a substantial improvement in final product properties with increased process latitude can be achieved by the process of this invention as opposed to the continuous processes known in the art. The feed monomer injection (FIM) technique in the process of this invention obviates the necessity of having high surfactant concentrations to maintain desired polymerization rates, conversion and latex stability during polymerization. The present invention also allows for lower polymerization temperatures which help reduce gel content in the polymer and lower residual styrene content which results in a tangible advantage in terms of economics and energy conservation due to lower steam usage in the steam-stripping operation. Apart from these advantages, the process of this invention gave the latex a higher surface tension and lower turbidity indicating smaller particle size compared to latices made by the conventional continuous process consisting of two reactors.

EXAMPLE 4

Variation in the amount of monomeric acid, the total surfactant concentration and the primary monomer split-ratio was evaluated in the formulation of Example 1. The monomeric acid concentrations were varied from 1.75 to 3.0 phm. The surfactant concentrations were varied from 0.4 to 1.0 phm and the primary monomer split-ratio (Reactor 1/Reactor 2) varied from 70/30 to 40/60 were examined in the process of this invention. Satisfactory latices with a wide range of properties were made.

EXAMPLE 5

A production scale unit was used to prepare a latex made with a 65/35 ratio of the primary monomers split between the first and second reactors. A styrene concentration of 60.0 phm in the formulation of Example 2 was evaluated in the following recipe to determine wet adhesion strength and was compared to a similar latex made by a conventional 2-reactor continuous process.

TABLE VI

|  | Dry Parts By Weight |
| --- | --- |
| Latex | 100.0 |
| *Craborchard #2 | 225.0 |
| **Alcogum 9656 (Thickner) | To viscosity of 15–16,000 mPa's (RVT #Sc @20 RPM) |
| Water | To 75.5% solids |

*Filler from Duvall Chemicals
**Thickner from H & S Industries

Secondary backed samples were prepared by hand-coating the carpet (greige goods) at a coating weight of 24 oz/yd$^2$ (813.6 gms/m$^2$). The secondary backing was 6 oz/yd$^2$ (203.4 gm/m$^2$). The prepared composite was dried and cured in an oven set at 150° C. Test results were as follows:

TABLE VII

| Adhesion Profile | Cured For Min. | Latex Made by 3-Reactor (FIM) Process | T-1000E Latex 2-Reactor Continuous Process |
| --- | --- | --- | --- |
| lbs/3-inch | 2 | 2.2 (3.2) | 2.8 (4.0) |
| (Kg/5 cm) | 4 | 3.4 (4.9) | 3.8 (5.5) |
|  | 6 | 4.7 (6.8) | 3.6 (5.2) |
|  | 8 | 5.1 (7.4) | 4.8 (6.9) |
|  | 10 | 5.9 (8.5) | 6.7 (9.7) |
| (10 min. cure & cool to ambient temp.) Ultimate |  | 17.7 (25.6) | 13.2 (19.1) |

| Wet Adhesion Strength | FIM Latex | | T-1000E Latex | |
| --- | --- | --- | --- | --- |
| lbs/3-inch. (Kg/5 cm) Cure Time | Cooled to Room Temp. & Tested | 30 Sec. Boil, then Tested | Cooled to Room Temp. & Tested | 30 Sec. Boil Then Tested |
| 8 min. | 21.5 (31.1) | 3.0 (4.3) | 11.0 (15.9) | 1.6 (2.3) |
| 10 min. | 21.7 (31.4) | 4.8 (6.9) | 24.7 (35.7) | 3.4 (4.9) |
| 12 min. | 24.6 (35.6) | 9.4 (13.6) | 24.0 (34.7) | 5.2 (7.5) |

Wet adhesion strength was determined on a 3 inch (~5 cm) carpet sample with a coating weight of 30 oz/yd$^2$ (0.10 gm/cm$^2$) and a secondary backing of 6 oz jute/yd$^2$ (0.02 gms/cm$^2$) that was cured at 150° C. The test samples were cured for 8, 10 and 12 minutes and then immersed in boiling water for 30 seconds and tested on a Scott Tensile Tester.

The superior water resistance property of the latex prepared by the process of this invention was demonstrated by the excellent water spot resistance of the gum films made from this latex.

Additionally, the latex prepared by the process of this invention demonstrated superior quick grab properties, wet adhesion and most importantly ultimate adhesion.

EXAMPLE 6

The latex of Example 5 made by the process of this invention was tested in the following paper coating formulation:

|  | Dry Parts By Weight |
| --- | --- |
| Latex | 17.0 |
| #1 Kaolin Clay | 50.0 |
| #2 Kaolin Clay | 50.0 |
| Wax Emulsion | 0.375 |
| Water Retention Aid | 0.2 |
| Water | To solids of 65% |

Samples of paperboard 0.014 (0.036 cm) in solid, bleached fourdrinier 52 lbs/1000 sq. ft (0.025 gms/cm$^2$) were coated on a lab size Keegan Coater at coating weights of 2.9 to 3.2 lbs/1000 sq. ft. (0.0014–0.0016 gm/cm$^2$) with Compound A (containing the latex of Example 5), Compound B (which is a commercially available Latex) made by the 2-reactor process and Compound C (a high quality commercially available latex known as Dow 620). The samples of the paperboard were tested with the following results:

TABLE VIII

|  | Compound A | Compound B | Compound C |
| --- | --- | --- | --- |
| 1. 75° Specular Gloss[1] | 65.7 | 62.4 | 55.6 |
| 2. IGT Dry Pick[2] | 672 | 650 | 726 |
| 3. IGT Wet Pick[3] | 6.75 | 6.5 | 5.0 |
| 4. Wax Pick[4] | 12 | 12 | 13 |
| 5. Brightness[5] | 88.8 | 88.8 | 88.7 |

[1]TAPPI Test #T-480
[2]TAPPI Test #499
[3]Water Sprayed During IGT Testing
[4]TAPPI Test #459
[5]TAPPI Test #452

These results indicate the latex made by the process of this invention had improved gloss and improved wet IGT pick with a good balance of other properties. Improved water resistance of the latex made by the process of this invention manifested in improved wet IGT pick property.

EXAMPLE 7

The latex of Example 5 was also evaluated in a nonasbestos (cellulose) beater addition application. Test samples from the latex of Example 5 and a competitive and commercially available carboxylated latex were prepared in accordance with the following formulation:

|  | Dry Parts By Weight |
| --- | --- |
| Bleached Sulfite Pulp | 100.0 |
| Alum | 20.0 |
| Antioxidant | 0.6 |
| Latex | 40.0 |
| Water | To 0.8% solid |
| Tamon TM SN (Rohm & Haas Co.) | 0.4 |

Torn bleached sulfite pulp was dispersed into water at 0.8% consistency in a Waring Blender set a high speed. After adding 20% solution of Alum, pH of the stock solution was adjusted to 7.0-8.0 with ammonium hydroxide and antioxidant solution was added. Before adding the latex to the stock solution 1% Tamon TM SN solution was mixed with the latex.

After precipitation was complete, a hand sheet was made in the Valley Sheet mold. The molded hand sheet is then removed from the Valley wire, wet pressed at 300 lbs. (~136 Kg) pressure for 5 minutes and dried for 25 minutes in the drier set at 121.1° C. The samples of hand sheets were tested with the following results.

TABLE IX

|  | Test Sheets | |
| --- | --- | --- |
|  | Example 5 Latex | Competitive Latex |
| Precipitation Time, minutes | 19 | 16 |
| *Canadian Std. Fresness, ml. | 370 | 425 |
| **Drainage, seconds | 48 | 70 |
| Wet Sheet weight, gms. | 69 | 80 |
| Caliper, points | 15.5 | 17.3 |
| Basis wt., lbs/3000 ft$^2$ (Kg/m$^2$) | 200 (0.32) | 229.5 (.3672) |
| Density, lbs/ft$^3$ (gms/l) | 51.6 (823.5) | 53.4 (855.4) |
| Tensile, psi (Kg/cm$^2$) | 6097 (428.7) | 4870 (342.4) |
| Elongation, % | 15.0 | 10.9 |

*TAPPI, T-227
**Similar to TAPPI, T-221

As the data indicates, the latex made by the process of this invention had overall superior properties than a presently accepted competitive latex. Specifically, tensile strength and elongation were superior to this commercially accepted latex.

EXAMPLE 8

To test the effect of the type and the point of addition of monomeric acid on polymerization and application properties, several vinyl acids were evaluated in the process of this invention using the formulation of Example 2. Acidic monomers employed were methacrylic, acrylic, fumaric and maleic acid. Satisfactory latices with different properties depending on the type of acid and its point of addition were made.

Example 9

Other functional monomers evaluated in the process of this invention were acrylamide, n-methlolacrylamide, 2-hydroxyethyl acrylate and dimethylaminoethyl methacrylate.

These functional monomers were injected into the first, second and third reaction zones to produce stable latices with special properties that would be useful in numerous applications.

EXAMPLE 10

The process of the present invention can also be used to produce rubbery or resin type polymers. The process of the present invention is preferably used with a low temperature initiator, a variety of monomers, a variety of surfactants and incremental addition of molecular weight modifiers to each of the reaction zones. The rubbery polymer portions of the resulting latices are isolated from the water phase by use of a number of different coagulant systems and dried to produce synthetic rubbers or resins useful in a variety of applications.

EXAMPLE 11

The process of the present invention can also be used to produce an improved reinforcing latex for use in foam compositions. The reactor system and the recipe as described in Example 1 were used to prepare a reinforcing latex for use in a latex composition for making rubber foam. The styrene/butadiene ratio in the monomer streams were varied from 70/30 to 100/0. The resulting latices were blended with conventionally made rubber foam latex in the proper proportions to yield a foam rubber product with a good balance of physical properties. The reinforcing latex obtained through the use of the present invention imparted enhanced mechanical stability, gauge recovery and compression resistance to foam rubber samples. These improved properties are not achieved when using a reinforcing latex produced by conventional means.

EXAMPLE 12

The process of the present invention can also be used to produce a base rubber foam latex. The reactor system and the recipe are as described in Example 1 except that a low temperature initiator system is preferred, a variety of surfactants are used and incremental addition of molecular weight modifiers is made to each of the reaction zones. The resulting rubber latex produced by the process of the present invention is then blended with reinforcing latex or used alone to produce cured foam rubber compositions.

INDUSTRIAL APPLICATION

The process of this invention, "feed monomer injection" (FIM) provides more process latitude and allows more effective raw material usage and is not limited to carboxylated latices. The process of the present invention can be employed advantageously in continuous emulsion polymerization of other types of products especially where reduced surfactant concentration and its concomittant effects and advantages are of special significance.

Greater flexibility in using a variety of surfactants at lower concentrations results in superior properties of the latex made by the process of the present invention and are particularly noticeable in carpet backing applications. However, carboxylated latices suitable for a variety of other industrial applications may readily be prepared by the process of this invention. Examples of other applications include paper coating, paper saturation, paper and felts made by asbestos and nonasbestos beater addition processes, upholstery backing, nonwovens and similar applications comprising the treatment of textiles and cellulosic and noncellulosic fibrous materials known in the art. Other polymers such as polybutadiene latex for high impact plastic modification, high styrene solution resins and water reducible resins for paints and coatings and emulsion rubber may also be prepared by the process of this invention.

While certain representative embodiments and details have been shown for the purpose of illustrating the invention, it will be apparent to those skilled in this art that various changes and modifications may be made therein without departing from the scope of this invention.

I claim:

1. A catalyzed continuous emulsion polymerization process for the production of a latex from components (a), (b), and (c) comprising: (a) at least one conjugated diene, (b) at least one non-carboxylic comonomer, (c) at least one ethylenically unsaturated polycarboxylic acid selected from the group consisting of maleic acid, fumaric acid and iticonic acid; wherein the percent by weight of (c) to (a) and (b) can range from at least 1 to 5; the polymerization reaction is carried out in two or more reaction zones in which all of component (c) and from 25 to 75 percent by weight of components (a) and (b) are polymerized in the first reaction zone at a pH of 1.5 to 2.5 to a conversion of 85 to 98 percent; the reaction is continued in a second zone, to which is supplied the balance of components (a) and (b) which is then polymerized to 85 to 95 percent conversion of total monomers charged followed by removing the reaction mixture from the second to a third reaction zone wherein the reaction mixture is polymerized to essentially complete monomer conversion.

2. A process according to claim 1 wherein the amount of monomeric components (a) and (b) supplied to the first zone is not less than 25 percent and not more than 75 percent of the total weight of monomeric components (a), and (b) supplied to all the polymerization reaction zones.

3. A process according to claim 1 in which 50 percent of the total of monomeric components (a) and (b) are supplied to the second zone.

4. A process according to claim 1 wherein at least one conjugated diene of 4–10 carbon atoms is selected from the groups comprising: butadiene, isoprene, 2,3-dimethyl butadiene and chloro-butadiene.

5. A process according to claim 1 wherein the conjugated diene is 1,3-butadiene and the noncarboxylic comonomer is styrene.

6. A process according to claim 1 wherein the conjugated diene is isoprene and the noncarboxylic comonomer is styrene.

7. A process according to claim 1 wherein the noncarboxylic comonomer is selected from the groups comprising styrene, α-methylstyrene, vinyl toluene, acrylonitrile, methacrylonitrile, vinylidine chloride, ethyl acrylate, butyl acrylate, methylmethacrylate, hexylacrylate, 2-ethyl hexyl acrylate.

* * * * *